United States Patent [19]

O'Donovan et al.

[11] Patent Number: 4,964,551
[45] Date of Patent: Oct. 23, 1990

[54] BICYCLE CHILD CARRIER ASSEMBLY

[75] Inventors: Robert O'Donovan, Wantagh; Robert Ippolito, Massapequa Park, both of N.Y.

[73] Assignee: Cycle Products Company, Commack, N.Y.

[21] Appl. No.: 329,479

[22] Filed: Mar. 28, 1989

[51] Int. Cl.⁵ ............................................. B62J 7/04
[52] U.S. Cl. ..................................... 224/32 A; 224/39
[58] Field of Search ............... 224/30 R, 32 R, 32 A, 224/31, 33 R, 39, 40, 158–161; 297/396, 410

[56] References Cited

U.S. PATENT DOCUMENTS

| | | | |
|---|---|---|---|
| 2,890,819 | 6/1959 | Glenny | 224/32 A |
| 3,802,598 | 4/1974 | Burger et al. | 224/32 A X |
| 3,970,345 | 7/1976 | Holcomb | 297/195 |
| 4,026,448 | 5/1977 | Lewis | 224/32 A |
| 4,030,648 | 6/1977 | Johnson et al. | 224/31 |
| 4,051,985 | 10/1977 | Berger | 224/32 A |
| 4,053,091 | 10/1977 | Martelet | 224/32 A |
| 4,085,968 | 4/1978 | Svenssen et al. | 297/243 |
| 4,141,587 | 2/1979 | Holcomb | 297/195 |
| 4,324,430 | 4/1982 | Dimas, Jr. et al. | 297/250 |
| 4,342,483 | 8/1982 | Takada | 297/488 |
| 4,367,829 | 1/1983 | Kusz | 224/31 |
| 4,440,331 | 4/1984 | Schimmels | 224/31 |
| 4,679,852 | 7/1987 | Anthony et al. | 297/464 |
| 4,685,741 | 8/1987 | Tsuge et al. | 297/467 |
| 4,779,930 | 10/1988 | Rosen | 297/397 X |
| 4,822,102 | 4/1989 | Duvenkamp | 297/410 X |
| 4,826,246 | 5/1989 | Meeker | 297/250 |
| 4,880,277 | 11/1989 | Takahashi et al. | 297/484 X |

FOREIGN PATENT DOCUMENTS

234053 12/1944 Switzerland ..................... 224/30 R

Primary Examiner—Ernest G. Cusick
Assistant Examiner—Robert M. Fetsuga
Attorney, Agent, or Firm—Gottlieb, Rackman & Reisman

[57] ABSTRACT

A child carrier assembly for a bicycle is provided. The child carrier assembly of the invention includes a seat assembly for retaining the child, a frame assembly for supporting the seat assembly on the bicycle behind the bicycle seat, and an assembly for strapping the child in a seat assembly. The carrier assembly also includes a head supporting assembly for supporting the head of the child when the child is carried in the carrier. The assembly of the invention can be removed from the bicycle without the use of any tools.

28 Claims, 5 Drawing Sheets

BICYCLE CHILD CARRIER ASSEMBLY

BACKGROUND

This application relates to a child carrier assembly for a bicycle, and more particularly to a bicycle child carrier assembly which may be easily attached to and detached from a bicycle and which includes a number of features that reduce possible injury to the child that is carried.

Bicycles are well known recreational vehicles, and are used by millions of individuals for transportation from one location to another. In addition, many individuals ride bicycles simply for the cardiovascular benefit that riding provides.

One disadvantage of a bicycle is that it is difficult to transport another individual, particularly a young child or infant. Therefore, if the rider is also a parent of a young child or is a young child's guardian, it is very often difficult to have the opportunity to ride a bicycle since the rider would not want to leave the child or infant unattended.

Therefore, it has been proposed to provide a bicycle carrier for young children which is mounted on the bicycle frame, preferably directly behind the seat. However, most child carrier seats for bicycles that have been marketed are not suitable for very young infants since they do not include the appropriate head and body support that such young children require. In addition, most prior art carriers which are attached to a bicycle are difficult to detach without the use of special tools.

Accordingly, it would be desirable to provide a bicycle carrier for a child, that overcomes the above disadvantages and which includes a number of features for preventing injury to the carried child.

SUMMARY OF THE INVENTION

Generally speaking, in accordance with the invention, a child carrier assembly for a bicycle is provided. The child carrier assembly of the invention includes a seat assembly for retaining the child, a frame assembly for supporting the seat assembly on the bicycle behind the bicycle seat, and an assembly for strapping the child in the seat assembly.

The seating assembly includes a seat, a back portion, and a pair of leg wells which receive the feet of a child. Also provided as part of the seat assembly is a pair of foot guards disposed between the rear wheel of the bicycle and the leg wells in order to prevent the child from inadvertently hurting his feet by kicking them inwardly towards the bicycle wheel.

The frame assembly includes a bracket system connected to and extending rearwardly from the seat post clamp of the seat tube of the bicycle frame and a carrier supporting frame coupled to the bracket system and supporting the seat assembly.

Both the bracket system and the carrier supporting frame enable the seat assembly to be easily and quickly removed from the bicycle.

The strapping assembly includes a breast shield releasably connectable to the seat assembly and a pair of straps extending from the breast shield that act as a shoulder harness for the child when the child is retained in the seat assembly.

The child carrier assembly of the invention further includes a head supporting assembly for supporting the head of the child when the child is carried in the carrier. The head supporting assembly includes a headrest disposed above the seat assembly and a pair of side rails interconnecting the headrest and the seat assembly, which help prevent the child from moving from side to side when carried by the carrier assembly.

Accordingly, it is an object of the invention to provide a child carrier assembly for a bicycle.

Still another object of the invention is to provide a bicycle child carrier assembly that includes a supporting headrest and protective side rails.

Still a further object of the invention is to provide a bicycle child carrier assembly having a pair of foot guards disposed between the child's feet and the bicycle wheel in order to prevent inadvertent injury.

Yet another object of the invention is to provide a bicycle child carrier assembly which may be easily attached to and detached from a bicycle.

Yet a further object of the invention is to provide a bicycle child carrier assembly which securely straps a child in the carrier.

Another object of the invention is to provide a bicycle child carrier assembly which is strong and durable.

Other objects of the invention will in part be obvious and will in part be apparent from the following description.

The invention accordingly comprises the several steps and the relation of one or more such steps with respect to each of the others, the device embodying the features of construction, combination of elements and arrangement of parts which are adapted to affect such steps, and the article which possess these characteristics, properties and relation of elements, all as exemplified in the detailed disclosure hereinafter set forth, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENT

Figure 1:
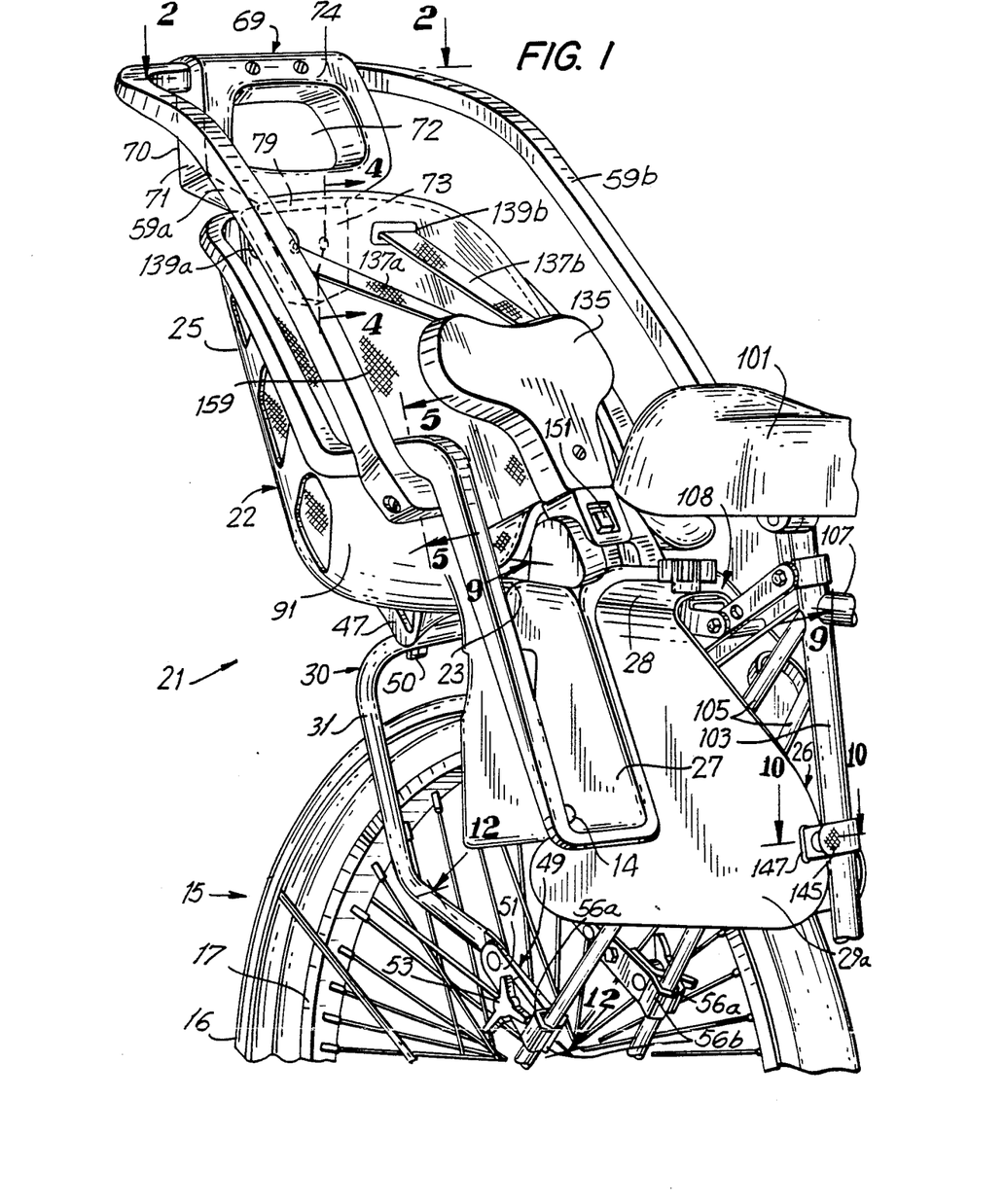
FIG. 1 is a perspective view of a bicycle child carrier assembly in accordance with the invention.

Referring first to FIG. 1, a bicycle child carrier assembly made in accordance with the invention and generally designated at 21 is illustrated. Carrier assembly 21 is mounted on a bicycle 15 having a front wheel (not shown), a rear wheel 17, in a fender 16, a seat 101, a seat bar 103 (retaining a seat post clamp 121) for supporting seat 101 and a pair of down bars 105 extending downwardly from seat tube 101 to the axle of rear wheel 17 (not shown). Carrier assembly 21 includes a carrier generally indicated at 22 for retaining a child, a frame assembly for supporting the carrier on a bicycle (see FIGS. 6–9 and FIGS. 12, 13), an assembly for strapping the child in the carrier (see FIGS. 1,7,9, and 11) and an assembly for supporting the head of the child when the child is retained in carrier 22 (see FIGS. 1–5).

Figure 7:
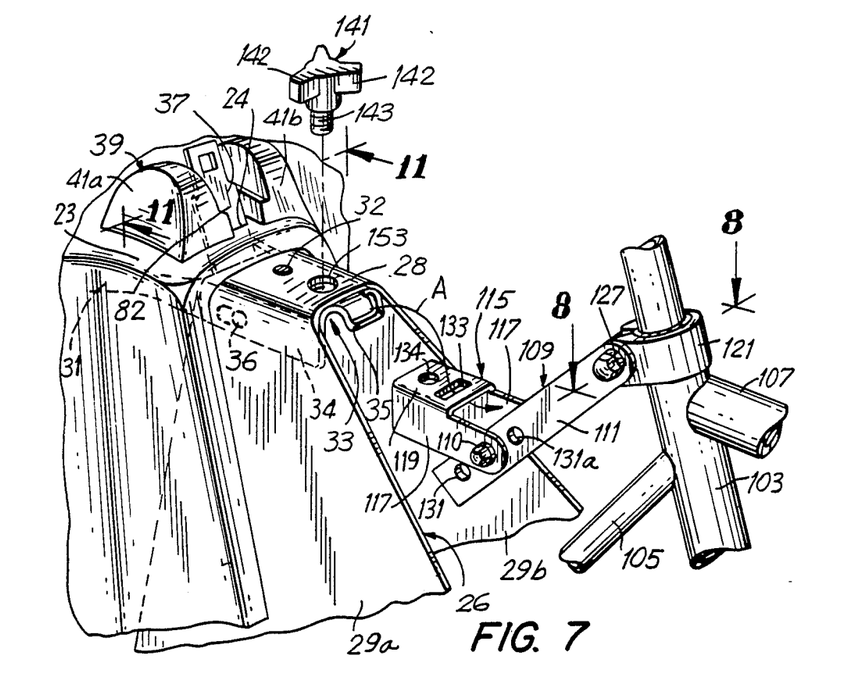
FIG. 7 is a perspective view showing the seat and adjustment bracket assembly shown in FIG. 6 connected to the child carrier of the assembly in a manner in accordance with the invention.
Figure 9:
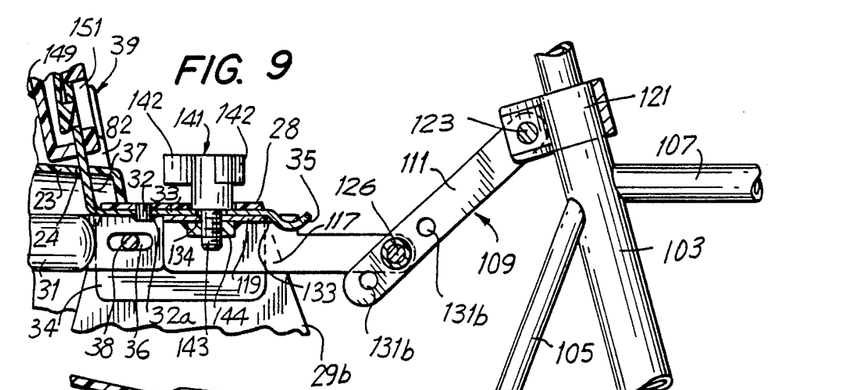
FIG. 9 is a cross-sectional view taken along line 9—9 of FIG. 1.

Referring still to FIG. 1, carrier 22 includes a seat portion 23, a back portion 25, (a pad 159 is shown covering seat 23 and back 25) sides 91, and a pair of leg wells 27 for retaining the legs of the child when the child is received in carrier 22. Carrier 22 further includes a foot guard assembly generally designated at 26 comprising a planer member 28 and a pair of foot guards 29a and 29b (see FIGS. 1 and 7). Foot guards 29a and 29b prevent the child retained in carrier 22 from injuring his leg if accidentally swung inwardly towards wheel 17 of bicycle 15. Foot guard assembly 26 is positioned below and forward of carrier 22 whereby planer member 28 is slightly underneath the forward portion of seat 23, as best shown in FIGS. 7 and 9. As described in more detail below, foot guard assembly 26 is coupled to carrier 22 when child carrier assembly 21 is attached to the bicycle carrier supporting assembly.

The assembly for supporting and mounting carrier 22 on bicycle 15 includes a carrier supporting frame generally designated at 30 (see FIGS. 1 and 13) and a bracket assembly generally designated at 108 (see FIG. 6) releasably coupled to carrier supporting frame 30 when mounting carrier 22 on bicycle 15, as described below, and connected to seat post clamp 121 of seat bar 103 of bicycle 15. Carrier supporting frame 30 comprises a latch bracket 33 (see FIG. 7) and a pair of seat support arms 31 (FIG. 1) rearwardly extending therefrom. Latch bracket 33 includes a pair of side planar members 34, a forwardly extending tongue 35 and an upwardly and rearwardly extending latch 37.

Figure 12:
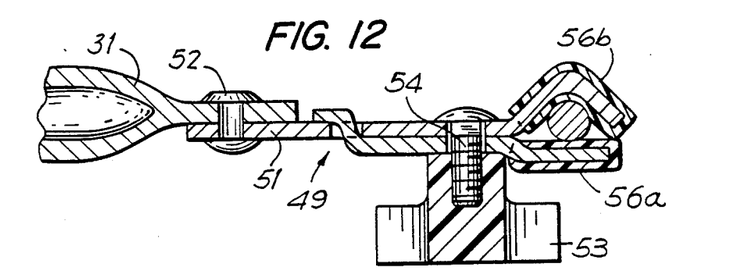
FIG. 12 is a cross-sectional view taken along line 12—12 of FIG. 1.

Support arms 31 extending rearwardly from latch bracket 33, as shown in FIGS. 1 and 7, are each provided with a clamp assembly generally designated at 49 at the forward lower end thereof. Referring specifically now to FIG. 12, clamp assembly 49 includes a pivot arm 51 that is pivotally connected to support arm 31 by pivot pin 52. Pivot arm 51 leads to a pair of clamp arms 56a and 56b which may be tightened and loosened in response to the turning of a knob 53 mounted on assembly 49 adjacent arms 56a and 56b. Knob 53 is fitted over a screw 54 extending through the ends of clamp arms 56a and 56b and is tightened and loosened about screw 54 in a conventional manner.

In order to connect support arms 31 to latch bracket 33, the upper ends of support arms 31 are positioned along the inside surface of side walls 34 of latch bracket 33. If appropriately positioned, as shown in FIG. 9, a passageway 36 is formed through one of side members 34 and the corresponding arm 31 and a second passageway (not shown) is formed through the other sidewall 34 and its corresponding support arm 31. Each of the passageways 36 receive a bolt 38 over which a nut is tightened in order to attach arms 31 to latch bracket 33.

Once latch bracket 33 is attached to arms 31 (completing assembly of carrier supporting frame 30), it is now necessary to attach frame 30 to carrier 22. Carrier 22 is formed with a pair of seat support members 47 extending from below seat 23, as shown in FIG. 1, which are connected to arms 31 by means of a corresponding pair of step bolts (not shown). Each step bolt is inserted through an opening formed in support members 47 and an opening formed in arms 31 (when both openings are aligned). After each bolt is inserted through the aligned openings, a corresponding hex nut 50 is tightened over the forward end of the bolt in order to secure support member 47 to arm 31.

Simultaneously, latch 37 of latch bracket 33 is inserted through a slot 24 formed in the front portion of seat 23 (see FIGS. 7 and 9). At this point in assembly, latch 37 can move up and down within slot 24, which as described below is necessary for the proper attachment of guard assembly 26 to carrier 22.

In order to attach guard assembly 26 to carrier 22, planar member 28 of assembly 26 is positioned over latch bracket 33 and partially under the front edge or lip of seat 23 until the rear edge of planar member 28 touches latch 37 of bracket 33 (see FIGS. 7 and 9). If guard assembly 26 is appropriately positioned, the rear hole formed in foot guard planer member 28 and the rear hole in latch bracket 33 will be aligned, which receive therethrough from above machine screw 32. A nut 32a is then tightened around the forward end of machine screw 32 in a conventional manner.

Leg wells 27 of carrier 22 are formed with a set of mounting holes 14 (see FIG. 1) and during assembly are aligned with corresponding side holes (not shown) in foot guards 29a and 29b. As before, a machine screw is inserted through each pair of aligned holes and a corresponding nut is tightened over the forward tip of each machine screw. As a result, foot guard assembly 26 is now securely attached to carrier 22 in accordance with the inventive assembly.

Figure 6:
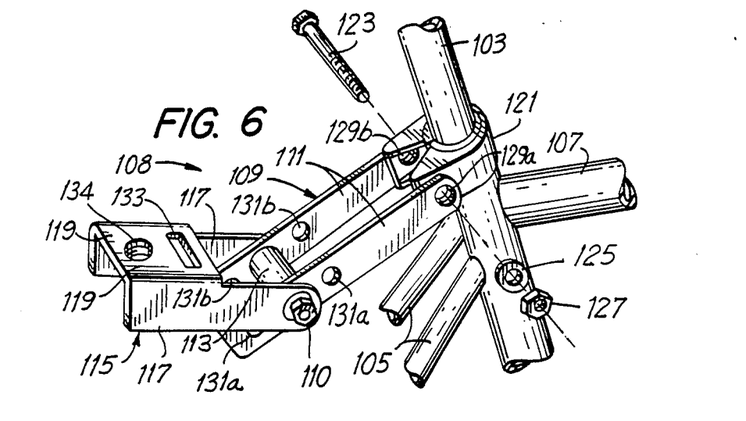
FIG. 6 is a perspective view of the seat and adjustment bracket assembly of the bicycle child carrier assembly of FIG. 1.

Referring now to FIG. 6, the second component of the supporting frame assembly of the invention is a bracket assembly generally designated at 108. Bracket assembly 108 consists of a seat bracket designated at 109 and an adjustment bracket designated at 115. Seat bracket 109 includes a pair of side members 111, each of which is formed with three holes 131a and 131b respectively, arranged linearly along the rear area of side members 111. Adjustment bracket 115 includes a pair of side members 117 and a top member 119 connecting only the rear portions of side members 117. Side members 117 are formed at their forward ends with aligned openings (not shown) and top member 119 includes a forward slot 133 and a rearwardly disposed hole 134.

In order to assemble seat bracket 109 to adjustment bracket 115, one must first select the proper pair of holes 131a and 131b for mounting carrier assembly 21 on bicycle 15. This is done by measuring from the pedal crank wheel (not shown) to the top of seat bar 103. This measurement will range between about 17 inches and 25 inches for most standard bicycles. If the measurement is between 17 and 18 inches, then one should select the rearmost holes 131a and 131b in side members 111 of seat bracket 109. If the measurement is between 19 and 21 inches, then middle holes 131a and 131b should be chosen. If the measurement is between 22 and 25 inches, then the frontmost holes 131a and 131b should be chosen.

Once the desired holes 131a and 131b are selected, seat bracket 109 is positioned within side members 117 of adjustment bracket 115 in order to align the selected holes 131a and 131b with the side holes in side members 117 of adjustment bracket 115 (see FIG. 7). A spacer tube 113 is then placed between selected holes 131a and 131b of seat bracket 109. Spacer tube 113 is formed with a tubular opening running therethrough for receiving a bolt 126 (FIG. 9) inserted through the holes in side members 117, the selected holes 131a and 131b formed in side members 111 and spacer tube 113. After the bolt is inserted through this pathway, a nut 110 is tightened over the forward end of the bolt, as shown in FIGS. 6 and 7, in order to pivotally attach seat bracket 109 to adjustment bracket 115.

Figures 2, 3, 4, 5:
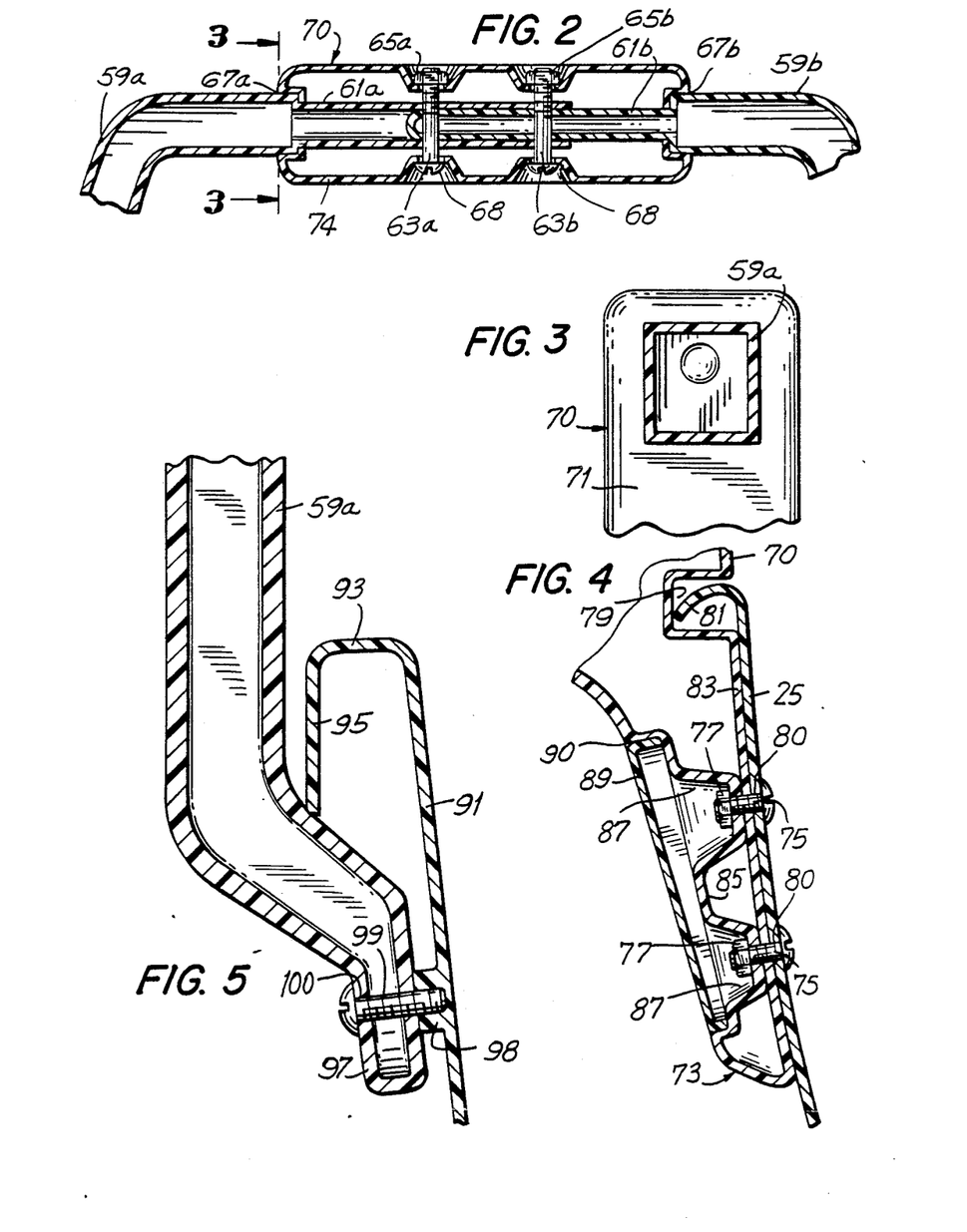
FIG. 2 is a cross-sectional view taken along line 2—2 of FIG. 1.
FIG. 3 is a cross-sectional view taken along line 3—3 of FIG. 2.
FIG. 4 is a cross-sectional view taken along line 4—4 of FIG. 1.
FIG. 5 is a cross-sectional view taken along line 5—5 of FIG. 1.

Turning to FIGS. 1-5, the head supporting assembly in accordance with the invention is now described. The head supporting assembly includes a headrest assembly generally designated at 69 and a pair of siderails 59a and 59b extending downwardly therefrom. Headrest assembly 69 comprises a donut shaped headrest 70, a mounting panel 73 extending downwardly therefrom and a channel 79 defined between headrest 70 and mounting panel 73. Headrest 70 includes an opening 72 for receiving the head of a child retained in child carrier 22, an upper member 74 formed with a pair of holes 68 (FIG. 2), and sidewalls 71 on either side thereof formed with openings 67a and 67b, respectively, for receiving the upper ends of rails 59a and 59b, as shown in FIGS. 2 and 3. Headrest 70 is designed to receive the head of a child who is wearing a bicycle helmet.

Referring to FIG. 2, rail 59a is formed at its upper end with a first plug 61a having a first pair of holes running therethrough and rail 59b is formed at its upper end with a second plug 61b having a second pair of holes running therethrough. In assembly, plug 61a of rail 59a is inserted through opening 67a while plug 61b of rail 59b is inserted through opening 67b. Since plug 61a has an internal passageway sufficiently sized to receive plug 61b, plugs 61a and 61b mate as shown in FIG. 2 wherein the first pair of holes in plug 61a, the second pair of holes in plug 61b and the pair of holes 68 formed in headrest 70 are aligned as shown. As a result, a pair of passageways are formed through the upper headrest 70 and plugs 61a and b through which machine screws 63a and 63b are inserted. After insertion, nuts 65a and 65b are screwed onto the ends of machine screws 63a and 63b and tightened appropriately, thereby securely attaching rails 59a and 59b to headrest 70 of assembly 69.

Turning now to FIGS. 4 and 5, as well as referring to FIG. 1, attachment of the head supporting assembly (headrest assembly 69 and rails 59a and 59b) to carrier 22 is now described. Headrest assembly 69 includes a headrest mounting panel 73, as described above, which includes a front wall 83 that is substantially flat and a back wall 85 having an uneven contour. Front wall 83 and back wall 85 have three sets of correspondingly aligned holes which emerge into three wells 87 (two of which are shown) formed along back wall 85.

In order to attach headrest mounting panel 73 to the back of seat back 25, as shown in FIGS. I and 4, the three holes 80 (two of which are shown in FIG. 4) formed in the upper portion of seat back 25 are aligned with the three openings running through headrest mounting panel 73. In order for alignment to be proper, lip 81 formed along the upper edge of seat back 25 sits within channel 79 that runs between headrest 70 and headrest mounting panel 73, as shown in FIG. 4. Once alignment of the three series of holes is achieved, machine screws 75 are inserted therethrough and nuts 77 are tightened over the ends of machine screws 75 in order to properly secure mounting panel 73 to seat back 25.

After attaching headrest mounting panel 73 to seat back 25 in the manner described above, a cover plate 89 is force fit into a cavity 90 (that retains wells 87) formed within back wall 85 of panel 73. Plate 89 prevents access to nuts 77 that are tightened about screws 75 running through seat back 25 and mounting panel 73, and also creates a substantially smooth back surface for mounting panel 73.

In FIG. 5, attachment of rails 59a and 59b to carrier 22 is shown. As described above, carrier 22 includes sides 91, each having a running edge 93 formed with a lip 95. Each side 91 further includes a threaded plug 98 extending outwardly therefrom, as shown in FIG. 5.

Rails 59a and 59b have a lower rail member 97 formed with an opening 100 running therethrough. In order to attach rail 59a (and 59b) to side 91 of carrier 22, opening 100 formed in rail member 97 is aligned with plug 98. This enables the insertion of a screw 99 through opening 100 and the threading thereof in plug 98, as shown in FIG. 5. As a result, rail end member 97 is securely attached to side 91 of carrier 22.

Figure 8:
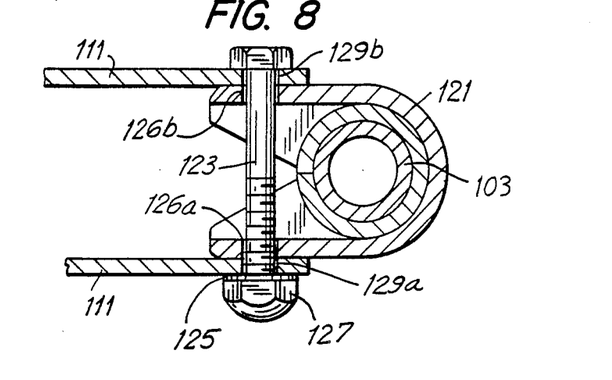
FIG. 8 is a cross-sectional view taken along line 8—8 of FIG. 7.

Turning once again to FIGS. 6-8, the mounting of carrier assembly 21 to bicycle 15 will now be described. In order to connect seat bracket 109 of bracket assembly 108 to seat bar 103 as shown, it is necessary to align forward seat bracket holes 129a and 129b with holes 126a and 126b formed in seat post clamp 121, as shown in FIGS. 6 and 8. Once alignment is achieved, a bolt 123 is inserted through the aligned holes, which then receives a lock washer 125 and a nut 127 in order to tighten the bolt and fasten the seat bracket 109 to seat post clamp 121.

Figure 11:
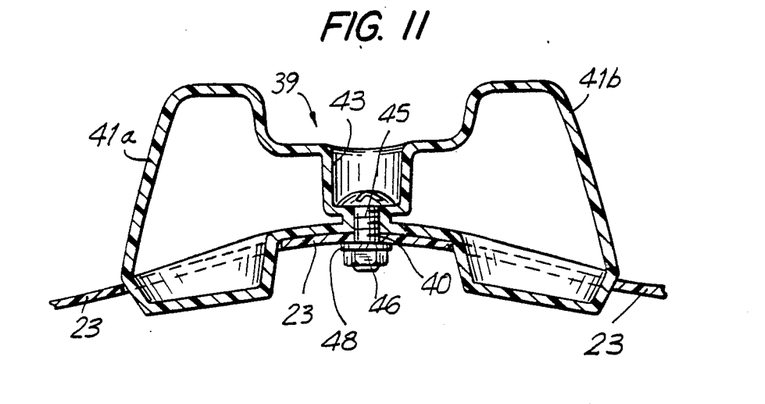
FIG. 11 is a cross-sectional view taken along line 11—11 of FIG. 7.

Reference is now made to FIGS. 7 and 11, which describe the attachment of a latch housing 39 to carrier 22. Latch housing 39 includes a first latch housing member 41a and a second latch housing member 41b which define a well 43 formed rearwardly in housing 39 between members 41a and 41b. Latch housing 39 defines a latch retaining region 82 disposed forward of well 43 and between members 41a and 41b (see FIGS. 7 and 9), which prevents access to latch 37 of latch bracket 33 by a child when carried in the child carrier assembly of the invention, as described below.

To attach latch housing 39 to carrier 22, housing 39 is seated snugly on seat 23 so that well 43 is aligned with hole 40 formed in seat 23 (see FIG. 11). If alignment is proper, then latch 37 extending upwardly from latch bracket 33 (latch bracket 33 has already been connected to carrier 22 as described above) is disposed within retaining region 82 defined by latch housing 39, as shown in FIGS. 7 and 9. Then, a screw 45 is inserted through well 43 of housing 39 and hole 40 in seat 23 (see FIG. 11), over which a washer 48 and nut 46 are placed in a conventional manner in order to fix screw 45 in place and securely attach latch housing 39 to seat 23.

Figures 13, 14:
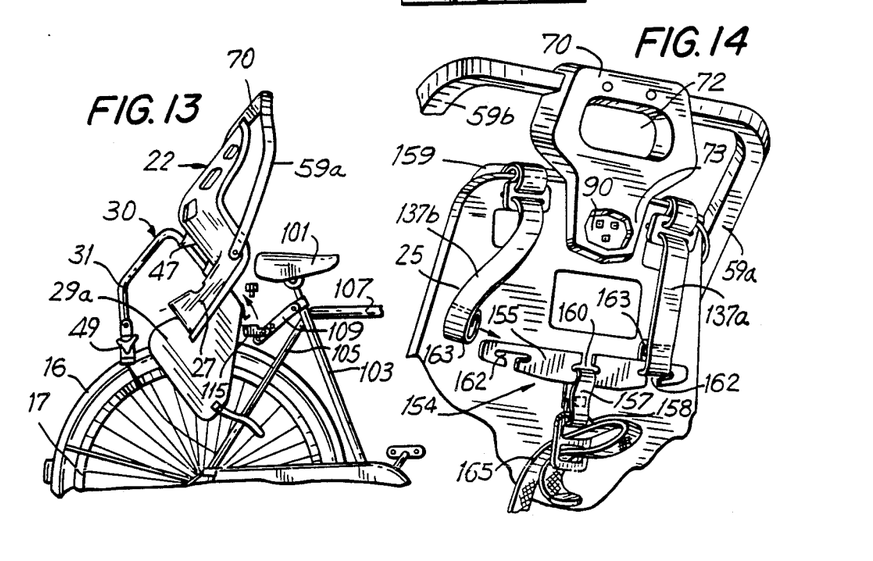
FIG. 13 is a front elevational view showing the manner in which the bicycle child carrier assembly of the invention is mounted on a bicycle.
FIG. 14 is a perspective view showing the back of the seat assembly of the carrier assembly of the invention.

Turning now to FIGS. 7, 9, 12 and 13, the mounting of child carrier assembly 21 to bicycle 15 is shown. In FIG. 13, child carrier 22 is lifted up and over rear bike wheel 17 and frame 16 while maintaining foot guards 29a and 29b open over wheel 17. Carrier assembly 22 is then tilted forward to allow tongue 35 of latch bracket 33 (connected to seat 23) to fit into slot 133 of adjustment bracket 115 (connected to seat bracket 109), as shown by arrow A in FIG. 7.

Once tongue 35 is received in slot 133, carrier 22 is lowered until clamp assembly 49 mounted at the ends of support arms 31 are lined up with down bars 105 (disposed on either side of wheel 17) and seat 23 of carrier 22 is level (see FIG. 1).

As shown in FIG. 12, to attach clamp assemblies 49 to down tubes 105, clamps 56a and 56b are opened by turning knobs 53 in a counter-clockwise direction and then placing clamps 56a and 56b over down bars 105 of bicycle 15. Then, knobs 53 of clamp assemblies 49 are tightened by rotating knobs 53 in a clockwise direction. As a result, clamps 56a and 56b are fitted tightly over down bars 105.

After tightening clamps 56a and 56b to down bars 105, a foot guard knob 141, as shown in FIGS. 7 and 9, is used. Knob 141 includes three wing members 142 and a screw 143 extending downwardly therefrom. In assembly, screw 143 of knob 141 is screwed through opening 153 in foot guard assembly 26 and through a hole formed of latch 34 formed through latch bracket 33 and hole 134 of adjustment bracket 115, as shown in FIGS. 6 and 9. After knob 141 is sufficiently tightened (by turning wing members 142), a nut 144 is positioned underneath and onto screw 143. This insures that the connection between carrier 22 and bracket assembly 108 is sufficiently strong.

Figure 10:
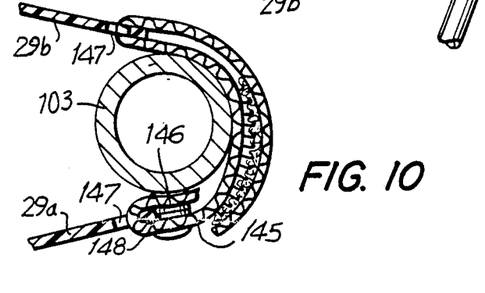
FIG. 10 is a cross-sectional view taken along line 10—10 of FIG. 1.

Referring now to FIGS. 1 and 10, in order to further secure child carrier assembly 21 to bicycle 15, each of foot guards 26 is provided with a slot 147 formed in the forward end thereof which receives a single Velcro strap 145. Velcro strap 145 includes along the inside portion thereof a snap 146 and a button 148 suitable for matingly engaging with snap 146. In use, strap 145 is threaded first through one of slots 147 from the inside to the outside of foot guard 29a to enable the engagement of snap 146 to button 148, as shown in FIG. 10. Then, the remaining portion of strap 145 is placed around seat tube 103 of bicycle 15 and then through slot 147 of the other foot guard 29b. Thereafter, strap 145 is pulled back around seat tube 103 and fastened, as shown in FIG. 10.

In order to strap the child in carrier 22 of carrier assembly 21, a harness assembly is provided. As illustrated in FIG. 1, the harness assembly includes a breast plate 135 and a pair of shoulder straps 137a and 137b extending upwardly therefrom. Breast plate 135 includes a release button assembly 149 (see FIG. 9) at the lower end thereof for releasably connecting to latch 37 of latch bracket 33. Button assembly 149 includes a button 151 which may be depressed in order to release latch 37 when received within button assembly 149.

Shoulder straps 137a and 137b extending from breast shield 135 are pulled through seat slots 139a and 139b formed in the upper portion of seat back 25, including through corresponding slots in a seat pad 159 fitted over carrier 22, as shown in FIGS. 1 and 14. The ends of shoulder straps 137a and 137b are connected to an adjusting strap assembly 154 (see FIG. 14) mounted on the rear side of seat back 25 (to prevent access thereto by the carried child), as described below, and may be adjusted in length in order to accomodate children of various sizes in carrier assembly 21.

Referring to FIG. 14, adjustment strap assembly 154 comprises a connector bar 155 and a buckle strap 157 secured within middle slot 160 of bar 155. As shown, connector bar 155 also includes a pair of side slots 162 for retaining loops 163 of straps 137a and 137b formed at the end thereof. Adjustment strap assembly 154 further includes a buckle 158 through which buckle strap 157 is threaded and an adjustment strap 165, also threaded through buckle 158, which may be adjusted up and down depending on the slack required for straps 137a and 137b. Buckle strap 165 is attached to the rear of back 25 by a screw assembly (not shown).

In order to place a child in bicycle child carrier assembly 21, it is necessary to first locate buckle 158 and buckle strap 165 of adjustment strap assembly 154 on the rear side of seat back 25. Then, lift the end of buckle 158 with one hand and pull adjustment strap 165 down with the other hand. This will cause the addition of slack to shoulder straps 137a and 137b. Once there is sufficient slack, push button 151 on release button assembly 149 of breast plate 135 to release buckle assembly 149 from latch 33.

After the above is completed, a child may be placed in carrier 22 with the child's head resting on headrest 70 and the child's feet retained within leg wells 27. After the child is positioned, breast plate 135 and shoulder straps 137a and 137b are carefully pulled over the head of the child. In so doing, straps 137a and 137b are positioned onto the shoulders of the child so that a substantially snug fit is achieved. This is achieved by pulling down on adjustment strap 165 of adjustment strap assembly 154 as necessary to remove any unwanted slack. Then, breast plate 135 is relocked into position by engaging release button assembly 149 with latch 37, as described previously.

In order to remove the child from carrier assembly 21, buckle 158 coupled to buckle strap 157 is lifted in order to once again add slack to adjustment strap 165. Then, button 151 of release button assembly 149 is pressed once again to release latch 37 therefrom and breast plate 135 is pulled away from latch 37 and up and over the head of the child. The child may then be lifted out of carrier 22.

It will thus be seen that the objects set forth above, among those made apparent from the preceeding description, are efficiently attained and, since certain changes may be made in carrying out the above process, in the described product, and in the construction set forth without departing from the spirit and scope of the invention, it is intended that all matter contained in the above description and shown in the accompanying drawings shall be interpreted as illustrated and not in a limiting sense.

It is also to be understood that the following claims are intended to cover all of the generic and specific features of the invention herein described, and all statements of the scope of the invention which, as a matter of language, might be said to fall therebetween.

What is claimed is:

1. For a bicycle having a seat, a front wheel and a rear wheel, and a frame including a seat bar for supporting said seat and a pair of down bars extending from said seat bar to said rear wheel on either side thereof, a child carrier assembly comprising:

a seating assembly for retaining a child a frame assembly connected to said seating assembly and adapted for supporting said seating assembly on said bicycle substantially behind said bicycle seat;

means for retaining the child in the seating assembly;

wherein said seating assembly includes a seat member, a pair of leg wells for receiving the feet of the child and a foot guard assembly for protecting the child retained by the carrier assembly from injuring his feet on said bicycle, said foot guard assembly comprising a protective sheet having a top portion disposed underneath said seat member and opposing side portions depending from said top portion and disposed on either side of said bicycle between said leg wells and at least partially forward thereof for completely overlapping said rear wheel, said foot guard assembly being secured to said seat member whereby said seat member and said guard assembly can be mounted and removed from said bicycle as a unit.

2. The carrier assembly of claim 1, wherein said foot guard assembly further includes means for connecting each of said opposing side portions to said seat bar.

3. The carrier assembly of claim 2, wherein each of said side portions includes a forward slot and said side portion connecting means comprises a strap means for tying said side portions to said seat bar by lacing said strap means through said side portion slots and wrapping said strap means around said seat bar.

4. The carrier assembly of claim 1, wherein said frame assembly comprises a seating assembly supporting frame and a bracket assembly releasably connectable to said seating assembly supporting frame and adapted for coupling to said seat bar of said bicycle frame.

5. For a bicycle having a seat, a front wheel and a rear wheel, and a frame including a seat bar for supporting said seat and a pair of down bars extending from said seat bar to said rear wheel on either side thereof, a child carrier assembly comprising:

a seating assembly for retaining a child;

a frame assembly adapted for supporting said seating assembly on said bicycle substantially behind said bicycle seat;

wherein said frame assembly includes a seating assembly supporting frame having a latch bracket disposed underneath and connected to said seating assembly;

wherein said frame assembly further includes a bracket assembly releasably connectable to said latch bracket of said seating assembly supporting frame;

wherein said bracket assembly includes a seat bracket adapted for coupling to said seat bar and an adjustment bracket selectively connectable to said seat bracket;

wherein said adjustment bracket is selectively connectable to said seat bracket at a plurality of locations thereon to enable said carrier assembly to be mounted on bicycles of various sizes;

wherein said latch bracket includes a forward tongue and said adjustment bracket includes a slot for selectively receiving the tongue of the latch bracket; and said bracket assembly including a first opening and said latch bracket including a second opening, said second opening adapted for alignment with the first opening for selectively retaining a connecting member therethrough when said tongue is received in said slot and said carrier assembly is mounted on the bicycle.

6. The carrier assembly of claim 5, wherein said seating assembly supporting frame further includes a pair of seat supporting arms having first ends coupled to said latch bracket and second ends adapted to be connected to said bicycle down bars.

7. The carrier assembly of claim 6, wherein said second ends of said supporting arms each include a clamp assembly adapted for releasably connecting said arms to said frame down bars.

8. For a bicycle having a seat, a front wheel and a rear wheel, and a frame including a seat bar for supporting said seat and a pair of down bars extending from said seat bar to said rear wheel on either side thereof, a child carrier assembly comprising:

a seating assembly for retaining a child including a seat member having opposing side edges, a frame assembly connected to said seating assembly and adopted for supporting said seating assembly on the bicycle substantially behind said bicycle seat;

means for supporting the back of the head of the child when the child is retained in said seating assembly, said supporting means comprising a substantially vertically extending headrest located rearwardly of the child; and means for retaining the child in the seating assembly including a pair of side rails independent of the seating assembly and connected to and extending along said side edges between said headrest and the seat member.

9. The carrier assembly of claim 8, wherein said headrest is formed with an opening therein for retaining at least in part the back of the head of said child.

10. The carrier assembly of claim 8, wherein said child retaining means further includes a breast shield adapted to be adjustably mounted to the seating assembly forward of the child when retained in the carrier.

11. The carrier assembly of claim 10, wherein said child retaining means further includes a pair of shoulder straps having first ends connected to said breast shield, said shoulder straps extending from the breast shield to a location behind the back of the carrier and adjustably connected at second ends thereof to said carrier.

12. The carrier assembly of claim 8, wherein said frame assembly comprises a seating assembly supporting frame and a bracket assembly releasably connectable to said seating assembly supporting frame and adapted for coupling to said seat bar of said bicycle frame.

13. For a bicycle having a seat, a front wheel and a rear wheel, and a frame including a seat bar for supporting said seat and a pair of down bars extending from said seat bar to said rear wheel on either side thereof, a child carrier assembly comprising:

a seating assembly for retaining a child including a seat portion;

a frame assembly adapted for supporting said seating assembly on said bicycle substantially behind said bicycle seat, said frame assembly including a seating assembly supporting frame having a latch bracket disposed substantially underneath said seating assembly and adapted for coupling thereto, said latch bracket adapted to be coupled to said bicycle having a latch projecting through an opening said seat portion of said seating assembly; and means for retaining said child in the seating assembly comprising a breast shield releasably connectable to said seating assembly and adapted to be mounted forward of the child when retained in said seating assembly and including a release button assembly for releasably coupling said projecting latch to said breast shield.

14. The carrier assembly of claim 13, wherein said release button assembly includes a push button, means for retaining said latch and means for releasing said latch from said latch retaining means in response to the activation of said button.

15. The carrier assembly of claim 14, wherein said latch retaining means further includes a latch housing mounted on said seating assembly for encasing said latch of said latch bracket.

16. The carrier assembly of claim 13, wherein said seating assembly supporting frame further includes a pair of seat supporting arms having ends coupled to said latch bracket.

17. The carrier assembly of claim 13, wherein said frame assembly further includes a bracket assembly releasably connectable to said latch bracket and adapted to be coupled to said seat bar of said bicycle frame.

18. The carrier assembly of claim 17, wherein said bracket assembly includes a seat bracket adapted to be coupled to said seat bar and an adjustment bracket selectively connectable to said seat bracket.

19. The carrier assembly of claim 13, wherein said child retaining means further includes a pair of side rails independent of the seating assembly and connected to and extending between said seating assembly and a headrest, said headrest connected to and extending above said seating assembly and adapted to be located rearwardly of the child when retained in the carrier assembly.

20. The carrier assembly of claim 13, wherein said frame assembly further includes a bracket assembly releasably connectable to said latch bracket and adapted for coupling to the seat bar of said bicycle frame.

21. For a bicycle having a seat, a front wheel and a rear wheel, and a frame including a seat bar for supporting said seat and a pair of down bars extending from said seat bar to said rear wheel on either side thereof, a child carrier assembly comprising:

a seating assembly for retaining a child;

a frame assembly connected to said seating assembly and adapted for supporting said seating assembly on said bicycle substantially behind said bicycle seat;

means for retaining said child in said seating assembly comprising a breast shield releasably connectable to said seating assembly and adapted to be mounted forward of the child when retained in said seating assembly, a pair of should straps connected to and extending from said breast shield to a location behind the back of said seating assembly, and means for adjusting the length of said shoulder straps;

wherein said adjusting means includes an adjustment strap connected to said seating assembly and which is adjustable in length and means for connecting said adjustment strap to said shoulder straps, said strap connecting means comprising a connector bar for retaining said shoulder straps, a buckle strap retained by said connector bar and a buckle interconnecting said buckle strap and said adjustment strap.

22. The carrier assembly of claim 21, wherein said child retaining means further includes a pair of side rails independent of the seating assembly and connected to and extending between the seating assembly and a headrest connected to and extending above the seating assembly, said headrest adapted to be located behind said child when retained in the carrier assembly.

23. The carrier assembly of claim 21, wherein said frame assembly comprises a seating assembly supporting frame and a bracket assembly releasably connectable to said seating assembly supporting frame and adapted for coupling to said seat bar of said bicycle frame.

24. For a bicycle having a seat, a front wheel and a rear wheel, and a frame including a seat bar for supporting said seat and a pair of down bars extending from said seat bar to said rear wheel on either side thereof, a child carrier assembly comprising:

a seating assembly for retaining a child, a frame assembly adapted for supporting said seating assembly on said bicycle substantially behind said bicycle seat;

means for retaining the child in the seating assembly;

wherein said frame assembly comprises a seating assembly supporting frame and a bracket assembly releasably connectable to said seating assembly supporting frame, said bracket assembly having a seat bracket adapted for coupling to said bicycle seat bar, an adjustment bracket selectively connectable to said seat bracket and a latch bracket disposed underneath and connected to said seating assembly, said latch bracket being selectively connectable to said adjustment bracket, said seat bracket adapted to be mounted at an angle with respect to said seat bar, said adjustment bracket being selectively connectable to said seat bracket at a plurality of locations on said seat bracket to enable said carrier assembly to be selectively mounted on bicycles of various sizes.

25. The carrier assembly of claim 24, wherein said latch bracket includes a forward tongue and wherein said adjustment bracket includes a slot adapted to selectively receive the tongue of the latch bracket.

26. The carrier assembly of claim 24, wherein said adjustment bracket includes a first opening and the latch bracket includes a second opening, said second opening adapted for alignment with said first opening for selectively receiving a connecting member therethrough when said carrier assembly is mounted on the bicycle.

27. The carrier assembly of claim 24, wherein said seating assembly supporting frame further includes a pair of seat supporting arms having first ends coupled to said latch bracket and second ends adapted to be connected to said bicycle down bars.

28. The carrier assembly of claim 27, wherein said second end of said supporting arms each include a clamp assembly adapted for releasably connecting said arms to said frame down bars.

* * * * *